United States Patent
Lee et al.

(10) Patent No.: US 11,915,155 B2
(45) Date of Patent: Feb. 27, 2024

(54) OPTIMIZATION CALCULATION APPARATUS AND OPTIMIZATION CALCULATION METHOD

(71) Applicants: Seoul National University R&DB Foundation, Seoul (KR); Korea University Research and Business Foundation, Seoul (KR)

(72) Inventors: Jongmin Lee, Seoul (KR); Kwanyoung Lee, Seoul (KR); Yeonsoo Kim, Seoul (KR); Taekyoon Park, Seoul (KR); Gobong Choi, Seoul (KR)

(73) Assignees: Seoul National University R&DB Foundation, Seoul (KR); Korea University Research and Business Foundation, Seoul (KR)

( * ) Notice: Subject to any disclaimer, the term of this patent is extended or adjusted under 35 U.S.C. 154(b) by 881 days.

(21) Appl. No.: 16/965,251

(22) PCT Filed: Oct. 8, 2018

(86) PCT No.: PCT/KR2018/011819
§ 371 (c)(1),
(2) Date: Jul. 27, 2020

(87) PCT Pub. No.: WO2019/151606
PCT Pub. Date: Aug. 8, 2019

(65) Prior Publication Data
US 2021/0224667 A1    Jul. 22, 2021

(30) Foreign Application Priority Data
Jan. 30, 2018  (KR) .................. 10-2018-0011562

(51) Int. Cl.
*G06N 5/04*    (2023.01)
*G06N 20/00*   (2019.01)
*G06F 17/18*   (2006.01)

(52) U.S. Cl.
CPC ............... *G06N 5/04* (2013.01); *G06N 20/00* (2019.01); *G06F 17/18* (2013.01)

(58) Field of Classification Search
CPC .......... G06N 3/12; G06N 3/126; G06N 3/086; G06N 5/04; G06N 20/00
See application file for complete search history.

(56) References Cited

U.S. PATENT DOCUMENTS

2007/0220586 A1    9/2007  Salazar et al.
2011/0246166 A1*  10/2011  Cho .................... G16B 15/00
                                                          703/11

(Continued)

FOREIGN PATENT DOCUMENTS

| KR | 1020110112833 A | 10/2011 |
| KR | 1020140133032 A | 11/2014 |
| WO | 2010079402 A1 | 7/2010 |

OTHER PUBLICATIONS

Sheikh et al., "Genetic Algorithm Based Clustering: A Survey", 2008, IEEE, pp. 314-319 (Year: 2008).*

(Continued)

*Primary Examiner* — Paulinho E Smith

(57) ABSTRACT

An optimization calculation apparatus may comprise an algorithm module obtaining a plurality of first solutions (S1) from a plurality of input data, obtaining second solutions (S2) from the first solutions (S1), and repeating the process to derive an optimal solution (Sm). The optimization calculation apparatus may further comprise a similarity determi- (Continued)

nation module connected to the algorithm module and computing a similarity of $i^{th}$ solutions in order to obtain $(i+1)^{th}$ solutions $(1 \leq i \leq m-1)$.

9 Claims, 4 Drawing Sheets

(56) References Cited

U.S. PATENT DOCUMENTS

2011/0307899 A1  12/2011  Lee et al.
2012/0123980 A1   5/2012  Bhandari et al.
2021/0224667 A1*  7/2021  Lee ..................... G06N 3/126

OTHER PUBLICATIONS

Kim et al, "An Efficient Genetic Algorithm with Less Fitness Evaluation by Clustering", 2001, IEEE, pp. 887-894 (Year: 2001).*
Bezdek et al, "Genetic Algorithm Guided Clustering", Jun. 1994, Research Gate, pp. 34-39 (Year: 1994).*
International Search Report dated Jan. 10, 2019 for International application No. PCT/KR2018/011819.

* cited by examiner

|      | 1        | 2        | 3        | 4        | 5        | 6        | 7        | J        |
|------|----------|----------|----------|----------|----------|----------|----------|----------|
| ref1 | 0.000000 | 0.000000 | 0.000000 | 0.000000 | 0.000000 | 0.000000 | 0.000000 | -        |
| ref2 | 0.800000 | 0.900000 | 1.100000 | 1.500000 | 1.900000 | 2.300000 | 1.400000 | -        |
| v1   | 1.000000 | 0.000000 | 1.000000 | 0.000000 | 2.000000 | 3.000000 | 2.000000 | 6.579159 |
| v2   | 3.000000 | 2.000000 | 0.000000 | 1.000000 | 2.000000 | 1.000000 | 0.000000 | 5.319637 |
| v3   | 0.000000 | 2.000000 | 0.000000 | 3.000000 | 1.000000 | 2.000000 | 0.000000 | 2.598194 |
| v4   | 0.000000 | 1.000000 | 1.000000 | 2.000000 | 3.000000 | 3.000000 | 2.000000 | 20.69137 |
| v5   | 1.000000 | 2.000000 | 3.000000 | 2.000000 | 1.000000 | 3.000000 | 2.000000 | 11.96457 |
| v6   | 1.000000 | 0.000000 | 1.000000 | 1.000000 | 2.000000 | 3.000000 | 2.000000 | 15.04937 |
| v7   | 0.000000 | 0.000000 | 2.000000 | 1.000000 | 3.000000 | 2.000000 | 1.000000 | 6.579159 |
| v8   | 0.000000 | 1.000000 | 1.000000 | 2.000000 | 2.000000 | 2.000000 | 1.000000 | 13.90558 |
| v9   | 1.000000 | 1.000000 | 1.000000 | 1.000000 | 1.000000 | 1.000000 | 2.000000 | 2.232927 |
| v10  | 1.000000 | 0.000000 | 1.000000 | 2.000000 | 2.000000 | 1.000000 | 2.000000 | 5.031754 |
|      | 0.800000 | 0.900000 | 1.100000 | 1.500000 | 1.900000 | 2.300000 | 1.400000 | 0        |

Fig. 3

| group | v   | J        | d        |   |   |   |   |   |   |   |
|-------|-----|----------|----------|---|---|---|---|---|---|---|
|       | v9  | 2.232927 | 0        | 1 | 1 | 1 | 1 | 1 | 1 | 2 |
| 1     | v3  | 2.598194 | 0.365267 | 0 | 2 | 0 | 3 | 1 | 2 | 0 |
|       | v10 | 5.031754 | 2.798827 | 1 | 0 | 1 | 2 | 2 | 1 | 2 |
|       | v2  | 5.319637 | 3.08671  | 3 | 2 | 0 | 1 | 2 | 3 | 0 |
| 2     | v1  | 6.579159 | 4.346232 | 1 | 0 | 1 | 0 | 3 | 3 | 2 |
|       | v7  | 6.579159 | 4.346232 | 0 | 0 | 2 | 1 | 3 | 2 | 1 |
| 3     | v5  | 11.96457 | 9.731644 | 1 | 2 | 3 | 2 | 1 | 3 | 2 |
|       | v8  | 13.90558 | 11.67265 | 0 | 1 | 1 | 2 | 2 | 2 | 1 |
| 4     | v6  | 15.04937 | 12.81644 | 1 | 0 | 1 | 1 | 2 | 3 | 2 |
| 5     | v4  | 20.69137 | 18.45844 | 0 | 1 | 1 | 2 | 3 | 3 | 2 |

Fig. 4

OPTIMIZATION CALCULATION APPARATUS AND OPTIMIZATION CALCULATION METHOD

CROSS-REFERENCE TO RELATED APPLICATION

This application is a national stage application, filed under 35 U.S.C. § 371, of International Patent Application No. PCT/KR2018/011819, filed on Oct. 8, 2018, which claims the priority of Korean application No. 10-2018-0011562 filed on Jan. 30, 2018, the contents of which are incorporated by reference.

TECHNICAL FIELD

The present invention relates to an optimization calculation apparatus and an optimization calculation method.

BACKGROUND ART

Genetic algorithm (GA) is based on the genetics of the natural world, and its basic concept includes Darwin's theory of survival of the fittest in particular. In genetic programming, genes are changed to find solutions with high accuracy after listing possible solutions to a problem. In other words, the genetic algorithm is considered as a search algorithm mimicking the evolution in order to seek better answers.

The genetic algorithm is widely used to obtain solutions in various optimization problems because of its robustness and convergence property. However, since the genetic algorithm is a heuristic-based algorithm, it has several drawbacks. That is, it is likely that an arbitrary judgment depending on the user is involved at the time of termination in particular. In addition, the computation time rises rapidly in proportion to the complexity of the problem.

DISCLOSURE

Technical Problem

In order to solve the above mentioned problems, the present invention provides an efficient optimization calculation apparatus.

In order to solve the above mentioned problems, the present invention provides an optimization calculation method using the optimization calculation apparatus.

The other objects of the present invention will be clearly understood by reference to the following detailed description and the accompanying drawings.

Technical Solution

An optimization calculation apparatus according to embodiments of the present invention comprises an algorithm module obtaining a plurality of first solutions (S1) from a plurality of input data, obtaining second solutions (S2) from the first solutions (S1) and repeating the process to derive an optimal solution (Sm), and a similarity determination module connected to the algorithm module and computing a similarity of $i^{th}$ solutions in order to obtain $(i+1)^{th}$ solutions ($1 \leq i \leq m-1$).

In the algorithm module, the $i^{th}$ solutions are clustered according to the similarity computed by the similarity determination module and arbitrary solutions are selected from the clustered $i^{th}$ solutions to obtain the $(i+1)^{th}$ solutions.

In the algorithm module, the clustering is performed by a statistical estimation method using mean, standard deviation, reliability and confidence interval of the similarity.

In the algorithm module, the clustering is controlled by the reliability.

The similarity is computed using the similarity determination function in the similarity determination module, and the similarity determination function uses a reference vector ($O_i$) representing a center of gravity of $(i-1)^{th}$ solution vectors, a radius ($r_{i,jk}$, $r_{i,jl}$) between the reference vector and the $i^{th}$ solution vectors, an adjacent distance ($d_{i,jk,jl}$) between two different $i^{th}$ solution vectors and an angle ($\theta_{i,jk,jl}$) between the two solution vectors based on the reference vector.

The similarity determination function comprises an equation using the reference vector, the radius, the adjacent distance and the angle, and the equation is $$J_{i,j_k,j_l} \equiv -\frac{(r_{i,j_k} - r_{i,j_l})^2 + d_{i,j_k,j_l}^2}{\|O_i\|^2} \times \tan(\theta_{i,j_k,j_l}).$$

An optimization calculation method according to embodiments of the present invention comprises a first step of obtaining a plurality of first solutions (S1) from a plurality of input data, a second step of computing a similarity using the first solutions (S1) and clustering the first solutions (S1), a third step of obtaining second solutions (S2) by selecting arbitrary solutions from the clustered first solutions (S1), and a fourth step of repeatedly performing the second step and the third step to derive an optimal solution (Sm).

In the second step, a similarity of $i^{th}$ solutions is computed in order to obtain $(i+1)^{th}$ solutions ($1 \leq i \leq m-1$), the $i^{th}$ solutions are clustered according to the similarity, and arbitrary solutions are selected from the clustered $i^{th}$ solutions to proceed to $(i+1)^{th}$ step.

In the second step, the clustering is performed by a statistical estimation method using mean, standard deviation, reliability and confidence interval of the similarity.

In the second step, the clustering is controlled by the reliability.

The similarity is computed using a similarity determination function in the second step, and the similarity determination function uses a reference vector ($O_i$) representing a center of gravity of $(i-1)^{th}$ solution vectors, a radius ($r_{i,jk}$, $r_{i,jl}$) between the reference vector and the $i^{th}$ solution vectors, an adjacent distance ($d_{i,jk,jl}$) between two different $i^{th}$ solution vectors and an angle ($\theta_{i,jk,jl}$) between the two solution vectors based on the reference vector.

The similarity determination function comprises an equation using the reference vector, the radius, the adjacent distance and the angle, and the equation is $$J_{i,j_k,j_l} \equiv \frac{(r_{i,j_k} - r_{i,j_l})^2 + d_{i,j_k,j_l}^2}{\|O_i\|^2} \times \tan(\theta_{i,j_k,j_l}).$$

Advantageous Effects

The optimization calculation apparatus and the optimization calculation method according to embodiments of the present invention can improve the calculation speed and lend mathematical reliability to increase the reliability of results.

DESCRIPTION OF DRAWINGS

FIG. 3 shows vector values for performing an algorithm according to another embodiment of the present invention.

FIG. 4 shows the result of performing the algorithm of FIG. 3.

BEST MODE

Hereinafter, a detailed description will be given of the present invention with reference to the following embodiments. The purposes, features, and advantages of the present invention will be easily understood through the following embodiments. The present invention is not limited to such embodiments, but may be modified in other forms. The embodiments to be described below are nothing but the ones provided to bring the disclosure of the present invention to perfection and assist those skilled in the art to completely understand the present invention. Therefore, the following embodiments are not to be construed as limiting the present invention.

It will be understood that, although the terms first, second, third etc. may be used herein to describe various elements, these elements should not be limited by these terms. These terms are only used to distinguish one element from another element.

In the present invention, i represents a process performing an algorithm for obtaining a solution or solutions from input data one time. It can be expressed in step or generation depending on the nature of the algorithm, and it is not limited to the above expression.

In the embodiment related to the algorithm used in the present invention, four requirements are needed. The requirements may correspond to the basic prerequisites for using a genetic algorithm.

Firstly, every solution has a genetic representation. This requirement is the basic assumption for using the genetic algorithm.

Secondly, the objective function does not diverge for all values in the solution domain. If the objective function diverges for some elements in the solution domain, it is improper to obtain the optimal solution.

Thirdly, it takes a finite amount of time to solve the optimization problem. In order to compare the efficiency of the existing algorithm and the algorithm of the present invention, the optimization problems must be resolved within a finite time.

Fourthly, there is an optimal solution under given constraints. If the optimal solution is not within a given range, the necessity of using the genetic algorithm disappears.

[Optimization Calculation Apparatus]

Figure 1:
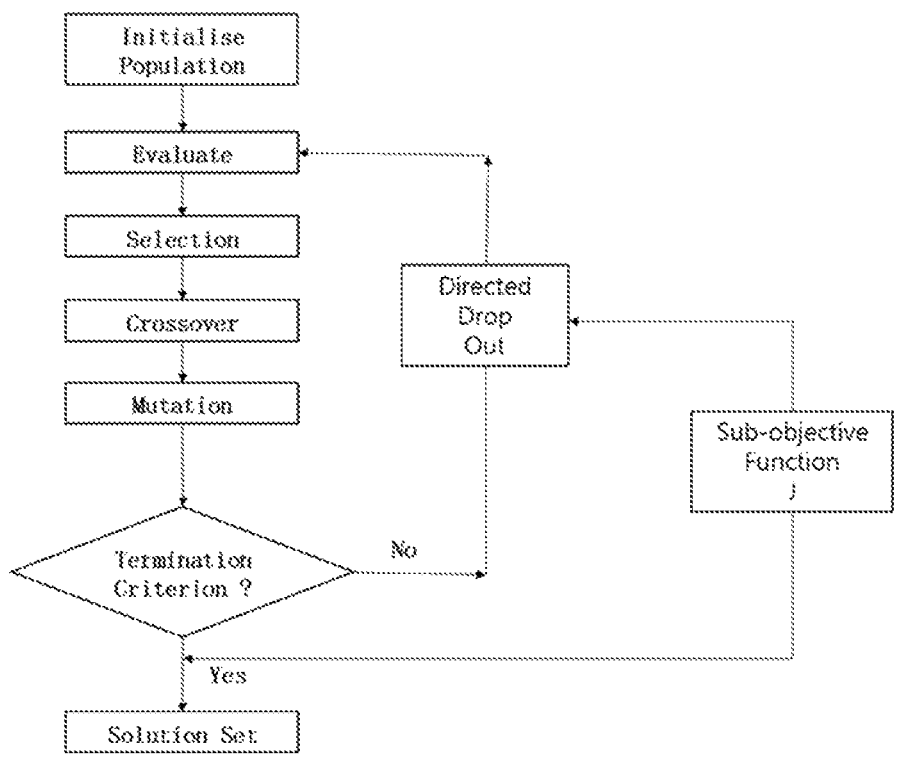
FIG. 1 is a flow chart according to an embodiment of the present invention.

FIG. 1 is a flow chart according to an embodiment of the present invention.

Referring to FIG. 1, an optimization calculation apparatus may comprise an algorithm module and a similarity determination module.

The algorithm module may obtain a plurality of first solutions (S1) from a plurality of input data, obtain second solutions (S2) from the first solutions (S1) and repeat the above process to derive an optimal solution (Sm). As the algorithm module, a genetic algorithm evolving a plurality of individuals to derive solutions by repeating generations may be used. The algorithm module may comprise a part for initialization of population, an evaluation part, a selection part, a part for crossover and mutation, and a termination part.

The part for initialization of population may determine a population. The size of the population may be determined by the user considering the nature of the problem to be optimized. Generally, the population may be randomly generated in the entire range of feasible solutions.

The evaluation part evaluates an objective function value for the generated population. The objective function may be multi-objective function.

In the selection part, an elite solution population may be selected based on the evaluation in order to breed a new generation.

In the part for crossover and mutation, in order to generate a new generation population from the selected solution, crossover and mutation method may be used. This may result in new solution set which is different from the previous solution set.

In the termination part, when a solution satisfying the minimum condition is found, the generation of a specific numerical value is reached, or the user's arbitrarily conditions are satisfied, the algorithm can be terminated.

The similarity determination module may be connected to the algorithm module to calculate the similarity of $i^{th}$ solutions in order to obtain $(i+1)^{th}$ solutions (or solution). The similarity determination module may have a sub-objective function for clustering, i.e. a similarity determination function. Since the calculation time required to obtain a solution is likely to increase when the criterion for each generation is examined, an elementary function that can be easily calculated may be used as the similarity determination function.

In order to make the similarity determination function, mathematical concepts such as a reference vector, a radius, an adjacent distance and an angle may be used.

The reference vector $O_i$ is a vector that determines the similarity between solution vectors. It may be defined as the mean value of solution vectors $s_{i-1,jk}$ obtained at each $(i-1)^{th}$ step of crossover and mutation as shown in equation (1). That is, when the generation is renewed, the reference vector is a vector of the center of gravity for the previous generation, and thus $i^{th}$ reference vector may be represented as the center of gravity for $(i-1)^{th}$ generation solution vectors. The initial value may be defined as the value that the user inputs. The value of the number $j_k$ of the solution vectors of each generation may vary according to each generation, that is, the value of i.

$$O_i \equiv \frac{\sum s_{i-1,j_k}}{j} \tag{1}$$

The radius $r_{i,jk}$ may be defined as the Euclidean norm between all k solution vectors generated in each generation and the reference vector of $i^{th}$ generation as shown in equation (2). As the radius decreases, the similarity increases with respect to the given reference vector.

$$r_{i,j_k} = d(O_i, s_{i,j_k}) \tag{2}$$

The adjacent distance $d_{i,j_k,j_l}$ may be defined as the Euclidean norm between two different solution vectors $s_{i,j_k}$ and $s_{i,j_l}$ belonging to the same generation as shown in equation (3). The closer the adjacent distance is, the higher the similarity is.

$$d_{i,j_k,j_l} \equiv d(s_{i,j_k}, s_{i,j_l}) \quad (3)$$

The angle may be defined as an angle $\theta_{i,j_k,j_l}$ between two different solution vectors belonging to the same generation based on the reference vector $O_i$ as shown in equation (4). The smaller the angle between the two vectors is, the higher the similarity is.

$$\theta_{i,j_k,j_l} \equiv \cos^{-1}\frac{(s_{i,j_k}-O_i)\cdot(s_{i,j_l}-O_i)}{\|s_{i,j_k}-O_i\|\|(s_{i,j_l}-O_i)\|} \quad (4)$$

Using the mathematical concepts, the similarity determination function may be expressed as shown in equation (5).

$$J_{i,j_k,j_l} \equiv \frac{(r_{i,j_k}-r_{i,j_l})^2 + d_{i,j_k,j_l}^2}{\|O_i\|^2} \times \tan(\theta_{i,j_k,j_l}) \quad (5)$$

The similarity determination function may be calculated $_kC_2$ times for k solution vectors belonging to $i^{th}$ generation. If the two solution vectors are identical to each other, the value of the function becomes 0.

Drop out policy may be included in the similarity determination module. The drop out policy may be established based on the calculated similarity determination function. If $J_{i,j_k,j_l} \leq K$, $s_{i,j_k}$ and $s_{i,j_l}$ are treated as belonging to the same group, and one of them are dropped out. K may be determined by a statistical estimation to be described later.

[Statistical Estimation]

Statistical estimation may be used to estimate population mean from sample values. As the number of samples increases, the reliability increases but the efficiency decreases.

Equations (6), (7) and (8) represent mean and variance.

$$r_{m,i} \equiv \text{mean}(r_{i,j_k}), v_{r,m,i} \equiv \text{var}(r_{i,j_k}) \quad (6)$$

$$d_{m,i} \equiv \text{mean}(d_{i,j_k,j_l}), v_{d,m,i} \equiv \text{var}(d_{i,j_k,j_l}) \quad (7)$$

$$\theta_{m,i} \equiv \text{mean}(\theta_{i,j_k,j_l}), v_{\theta,m,i} \equiv \text{var}(\theta_{i,j_k,j_l}) \quad (8)$$

If the standardization method is used based on the mean and variance, it is possible to set an interval (Interval generation). It is also possible to have the virtual interval where the solutions are treated as belonging to the same group with a specific mathematical confidence, $Z_{confidence}$.

$$U_{variable} = [m_{variable} - \alpha, m_{variable} + \alpha] \text{ where} \quad (9)$$
$$\alpha = Z_{confidence} \times \frac{\sigma(U_{variable})}{\sqrt{n}}.$$

For example, if a 95% reliability is used, $Z_{confidence}=1.96$. Here n is the number of $U_{variable}$.

K can be defined in various ways. K may be defined in the simplest form in the present invention as shown in equation (10).

$$K \equiv \min(U_r, U_d, U_\theta) \quad (10)$$

The solutions can be clustered by the virtual interval based on the statistical estimation of the similarity determination function. In the clustered solution group, solutions belonging to the same group are judged to be similar, and only one random solution can be extracted to proceed to the next generation. As the generations are repeated, the number of groups of the clustered solutions may be reduced, and thus the calculation speed may be increased. The calculation may be terminated when a predetermined standard set by the user is reached.

[Profile of $Z_{confidence}$]

Figure 2:
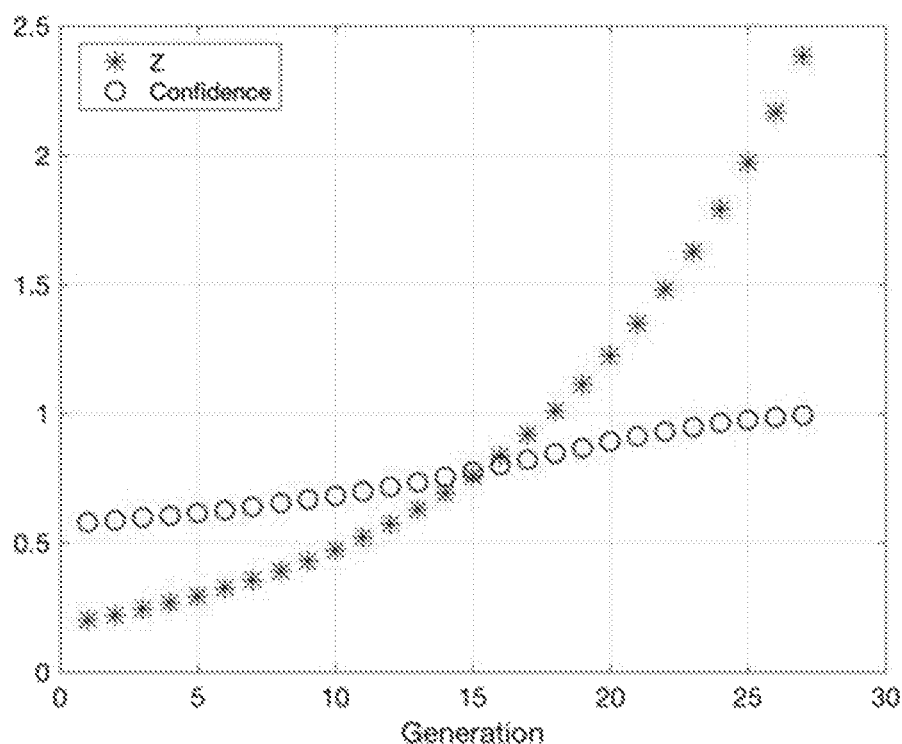
FIG. 2 shows a profile of $Z_{confidence}$ according to an embodiment of the present invention.

FIG. 2 shows a profile of $Z_{confidence}$ according to an embodiment of the present invention. When a new generation is produced, it is possible to reduce the number of solution vectors extracted efficiently by controlling the value of $Z_{confidence}$. Depending on the system, various profiles of $Z_{confidence}$ become possible. For example, monotone increasing function and monotone decreasing function can be used.

Monotone increasing function can reduce the number of solutions extracted and the computational time as the value of $Z_{confidence}$ continues to increase. The degree of reduction of $Z_{confidence}$ according to the generation can be appropriately adjusted according to the needs of the user. The function can be used when the degree of similarity between the solutions obtained is high.

When monotone decreasing function is applied, the number of solution vectors extracted increases over the generations. Using these functions for all intervals has the disadvantage of increasing the amount of computation while the scope of observation is increasing. The function can be used when the number of solution vectors is too small to proceed with the genetic algorithm.

The profile of $Z_{confidence}$ can be set flexibly based on the similarity between the solutions obtained and the value of the objective function calculated therefrom. Referring to FIG. 2, the monotone decreasing function of the exponential function type may be used in the present invention.

[Process of Applying Similarity Determination Function]

A calculation method using the optimization calculation apparatus may comprise a first step of obtaining a plurality of first solutions (S1) from a plurality of input data, a second step of calculating a similarity using the first solutions (S1) and clustering the first solutions (S1), a third step of obtaining second solutions (S2) by selecting arbitrary solutions from the clustered first solutions (S1), and a fourth step of repeatedly performing the second step and the third step to derive an optimal solution (Sm).

In the second step, a similarity of $i^{th}$ solutions is calculated in order to obtain $(i+1)^{th}$ solutions ($1 \leq i \leq m-1$), the $i^{th}$ solutions are clustered according to the similarity, and arbitrary solutions are selected from the clustered $i^{th}$ solutions to proceed to $(i+1)^{th}$ step.

FIG. 3 shows vector values for performing an algorithm according to another embodiment of the present invention, and FIG. 4 shows the result of performing the algorithm of FIG. 3. The algorithm of the present invention is performed on ten 7-dimensional vectors belonging to a specific generation.

Referring to FIG. 3, the similarity determination function is calculated based on the reference vector that is the center of gravity of the previous generation, and the mean and standard deviation of the calculated similarity determination function values are calculated. Here, the mean is calculated as 8.99 and the standard deviation is calculated as 6.09.

The reliability to be used for the statistical estimation is selected, and Z value is obtained accordingly. For example, when the reliability is 95%, Z may have a value of 1.96, and when the reliability is 99%, Z may have a value of 2.58. Here, 95% reliability is selected and thus Z has a value of 1.96.

A confidence interval L is calculated based on the mean, the standard deviation and the Z value, and a difference between the maximum value and the minimum value among the similarity determination function values is calculated to obtain a range and define it as R. Here, L is 3.77 and R is 18.45.

The number of groups N can be obtained by using the values of L and R as shown in equation (11).

$$N=[R/L]+1 \tag{11}$$

Here, N is 5.

Referring to FIG. 4, the similarity determination function values may be sorted in ascending order, and then, values less than or equal to the minimum value plus L may be divided into a first group. If this dividing process is repeated for the remaining similarity determination function values, ten vectors may be divided into five groups.

Next generation calculation of the genetic algorithm may be performed based on the divided solution vectors. The previous processes can be repeatedly performed by selecting one random vector from each of the five groups. If N value decreases below a certain number of groups determined by the user under the reliability desired by the user as a result of the performance, the genetic algorithm can be terminated.

[Simulation]

In order to compare the existing genetic algorithm with the genetic algorithm used in the present invention, the genetic algorithms are applied to the passive selective catalytic reduction (pSCR) system as an example. Parameters can be predicted through this application to compare the results obtained by using the genetic algorithm of the present invention with known parameter values. Major comparisons such as the angle with the actual solution vector, the distance, the value of the objective function and the like can be made.

The objective function is set to the cumulative concentration of $NO_x$ and $NH_3$ that should be minimized in the pSCR. The number of generations is fixed to 35.

Figure 5:
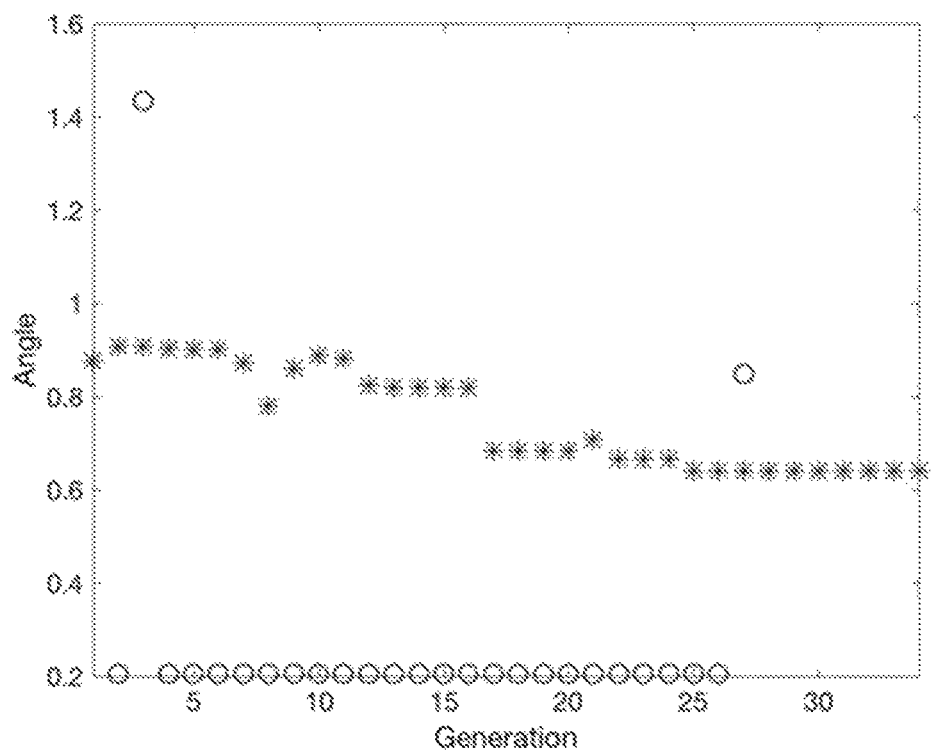
FIG. 5 shows an angle with an actual solution vector according to an embodiment of the present invention.
Figure 6:
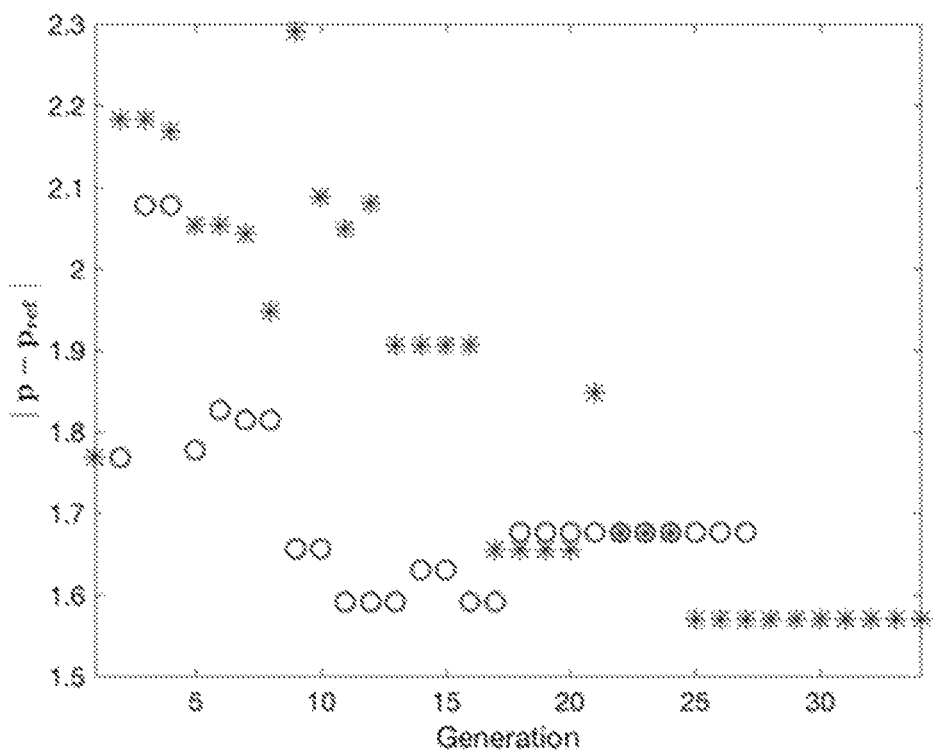
FIG. 6 shows a distance from an actual solution vector according to an embodiment of the present invention.
Figure 7:
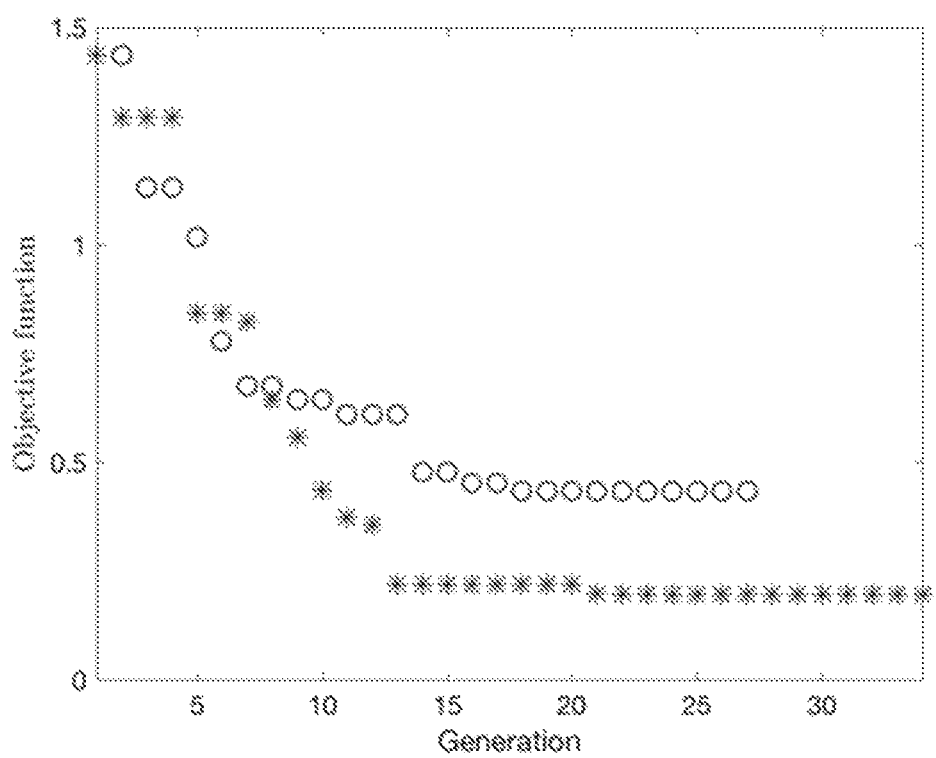
FIG. 7 shows an objective function value according to an embodiment of the present invention.

FIG. 5 shows an angle with an actual solution vector according to an embodiment of the present invention, FIG. 6 shows a distance from an actual solution vector according to an embodiment of the present invention, and FIG. 7 shows an objective function value according to an embodiment of the present invention.

In FIGS. 5 to 7, ▓ indicates that the existing genetic algorithm is used, and ◯ indicates that the genetic algorithm of the present invention is used. It is shown that the genetic algorithm of the present invention does not generate a solution after the 27th generation.

Referring to FIG. 5, except for 2nd and 27th generation, the angle with the actual solution vector in the genetic algorithm of the present invention is much smaller than that in the existing genetic algorithm in all segments. That is, the results show that the genetic algorithm of the present invention has the similarity with the reference solution vector higher than that of the existing genetic algorithm.

Referring to FIG. 6, the distance to the actual solution vector in the genetic algorithm of the present invention is shorter than that in the existing genetic algorithm from 1 to 17 generations so that it can be judged that the degree of similarity is high, and thereafter, the distance to the actual solution vector in the genetic algorithm of the present invention is longer than that in the existing genetic algorithm so that it can be judged that the degree of similarity is low.

Referring to FIG. 7, the objective function shows a tendency to decrease in both the method of the existing genetic algorithm and the method of the genetic algorithm of the present invention, and does not show significant change after 15th generation. After 15th generation, the objective function value of the solution vector obtained from the existing genetic algorithm corresponds to about half of the objective function value of the genetic algorithm of the present invention.

Even though the genetic algorithm of the present invention shows better performance in angle and distance than the existing genetic algorithm, the calculated value of the objective function of the genetic algorithm of the present invention is larger than that of the existing genetic algorithm. However, this is due to the fact that the currently set $Z_{confidence}$ profile is a monotone increasing function, and if the profile of Z is controlled, the genetic algorithm of the present invention may have an even better result after the 27th generation.

In addition, when compared to the time spent, the existing genetic algorithm takes up to 1.6 hr/generation, but the genetic algorithm of the present invention takes 0.57 hr/generation so that it shows a speed three times faster than the existing genetic algorithm (Computation is performed on an Intel i5-4670 3.40 GHz processor). Therefore, if the time required is included in the use of the genetic algorithm, it can be judged that the genetic algorithm of the present invention is sufficiently competitive to the existing genetic algorithm. The long computational time of the genetic algorithm makes it hard to check robustness. According to the genetic algorithm of the present invention, it is possible to run the genetic algorithm several times during the same time interval, and thus it can guarantee robustness.

Although the embodiments of the present invention have been disclosed for illustrative purposes, those skilled in the art will appreciate that the present invention may be embodied in other specific ways without changing the technical spirit or essential features thereof. Therefore, the embodiments disclosed in the present invention are not restrictive but are illustrative. The scope of the present invention is given by the claims, rather than the specification, and also contains all modifications within the meaning and range equivalent to the claims.

INDUSTRIAL APPLICABILITY

The optimization calculation apparatus and the optimization calculation method according to embodiments of the present invention can improve the calculation speed and lend mathematical reliability to increase the reliability of results.

The invention claimed is:

1. An optimization calculation apparatus comprising:
an algorithm module obtaining a plurality of first solutions (S1) from a plurality of input data, obtaining second solutions (S2) from the first solutions (S1) and repeating the process to derive an optimal solution (Sm); and
a similarity determination module connected to the algorithm module and computing a similarity of $i^{th}$ solutions in order to obtain $(i+1)^{th}$ solutions ($1 \leq i \leq m-1$),
wherein, in the algorithm module, the $i^{th}$ solutions are clustered according to the similarity computed by the similarity determination module and arbitrary solutions are selected from the clustered $i^{th}$ solutions to obtain the $(i+1)^{th}$ solutions, and wherein the similarity is computed by using a similarity determination function in the similarity determination module, and the similarity determination function uses a reference vector ($O_i$) representing a center of gravity of $(i-1)^{th}$ solution vectors, a radius ($r_{i,jk}$, $r_{i,jl}$) between the reference vector and the $i^{th}$ solution vectors, an adjacent distance ($d_{i,jk,jl}$) between two different $i^{th}$ solution vectors and an angle ($\theta_{i,jk,jl}$) between the two solution vectors based on the reference vector.

2. The optimization calculation apparatus of claim 1, wherein, in the algorithm module, the clustering is performed by a statistical estimation method using mean, standard deviation, reliability and confidence interval of the similarity.

3. The optimization calculation apparatus of claim 2, wherein, in the algorithm module, the clustering is controlled by the reliability.

4. The optimization calculation apparatus of claim 1, wherein the similarity determination function comprises an equation using the reference vector, the radius, the adjacent distance and the angle, and the equation is $$J_{i,j_k,j_l} \equiv \frac{(r_{i,j_k} - r_{i,j_l})^2 + d_{i,j_k,j_l}^2}{\|O_i\|^2} \times \tan(\theta_{i,j_k,j_l}).$$

5. An optimization calculation method comprising:
a first step of obtaining, using a processor, a plurality of first solutions (S1) from a plurality of input data;
a second step of computing, using a processor, a similarity using the first solutions (S1) and clustering the first solutions (S1);
a third step of obtaining, using a processor, second solutions (S2) by selecting arbitrary solutions from the clustered first solutions (S1); and
a fourth step of repeatedly, using a processor, performing the second step and the third step to derive an optimal solution (Sm),
wherein, in the second step, a similarity of $i^{th}$ solutions is computed in order to obtain $(i+1)^{th}$ solutions ($1 \leq i \leq m-1$), the $i^{th}$ solutions are clustered according to the similarity, and arbitrary solutions are selected from the clustered $i^{th}$ solutions to proceed to $(i+1)^{th}$ step, and
wherein the similarity is computed by using a similarity determination function in the second step, and the similarity determination function uses a reference vector ($O_i$) representing a center of gravity of $(i-1)^{th}$ solution vectors, a radius ($r_{i,jk}$, $r_{i,jl}$) between the reference vector and the $i^{th}$ solution vectors, an adjacent distance ($d_{i,jk,jl}$) between two different $i^{th}$ solution vectors and an angle ($\theta_{i,jk,jl}$) between the two solution vectors based on the reference vector.

6. The optimization calculation method of claim 5, wherein, in the second step, the clustering is performed by a statistical estimation method using mean, standard deviation, reliability and confidence interval of the similarity.

7. The optimization calculation method of claim 6, wherein, in the second step, the clustering is controlled by the reliability.

8. The optimization calculation method of claim 5, wherein the similarity determination function comprises an equation using the reference vector, the radius, the adjacent distance and the angle, and the equation is $$J_{i,j_k,j_l} \equiv \frac{(r_{i,j_k} - r_{i,j_l})^2 + d_{i,j_k,j_l}^2}{\|O_i\|^2} \times \tan(\theta_{i,j_k,j_l}).$$

9. A non-transitory computer-readable medium including a program code that, when executed by a processor, causes the processor to:
obtain a plurality of first solutions from a plurality of input data;
compute a similarity using the first solutions and clustering the first solutions;
obtain second solutions by selecting arbitrary solutions from the clustered first solutions; and
repeatedly perform the second step and the third step to derive an optimal solution, wherein, in computing the similarity, a similarity of $i^{th}$ solutions is computed in order to obtain $(i+1)^{th}$ solutions ($1 \leq i \leq m-1$), the $i^{th}$ solutions are clustered according to the similarity, and arbitrary solutions are selected from the clustered $i^{th}$ solutions to proceed to $(i+1)^{th}$ step, and
wherein the similarity is computed by using a similarity determination function in the second step, and the similarity determination function uses a reference vector ($O_i$) representing a center of gravity of $(i-1)^{th}$ solution vectors, a radius ($r_{i,jk}$, $r_{i,jl}$) between the reference vector and the $i^{th}$ solution vectors, an adjacent distance ($d_{i,jk,jl}$) between two different $i^{th}$ solution vectors and an angle ($\theta_{i,jk,jl}$) between the two solution vectors based on the reference vector.

* * * * *